Figure 4:
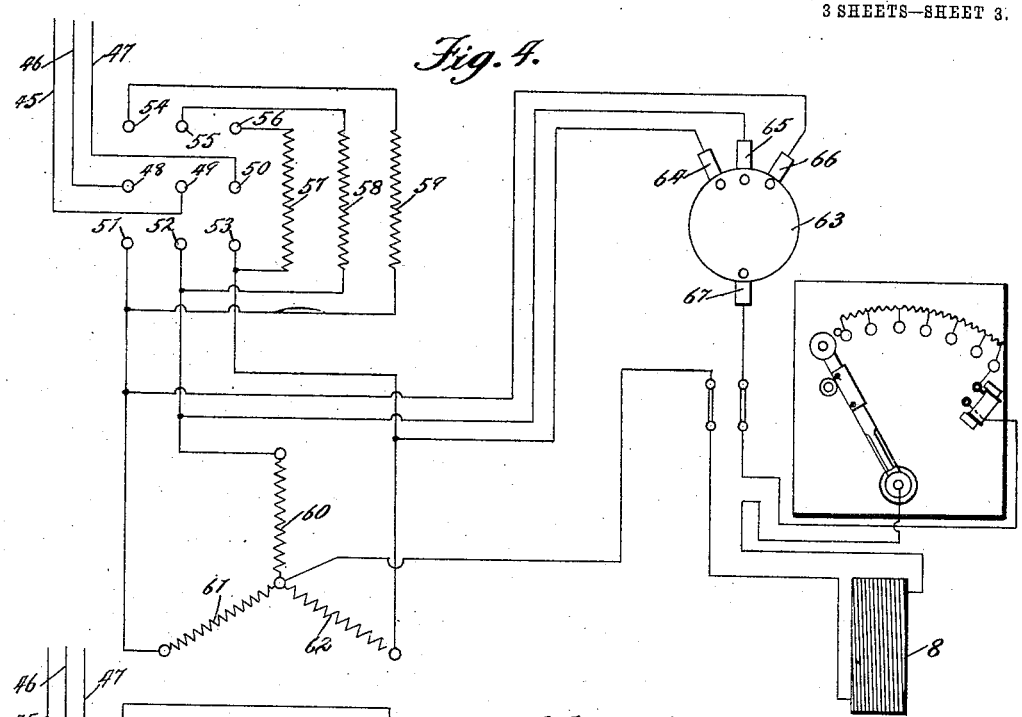

No. 786,415. PATENTED APR. 4, 1905.
H. H. CUTLER.
ALTERNATING CURRENT POWER TRANSMITTING APPARATUS.
APPLICATION FILED OCT. 22, 1903.
3 SHEETS—SHEET 1.
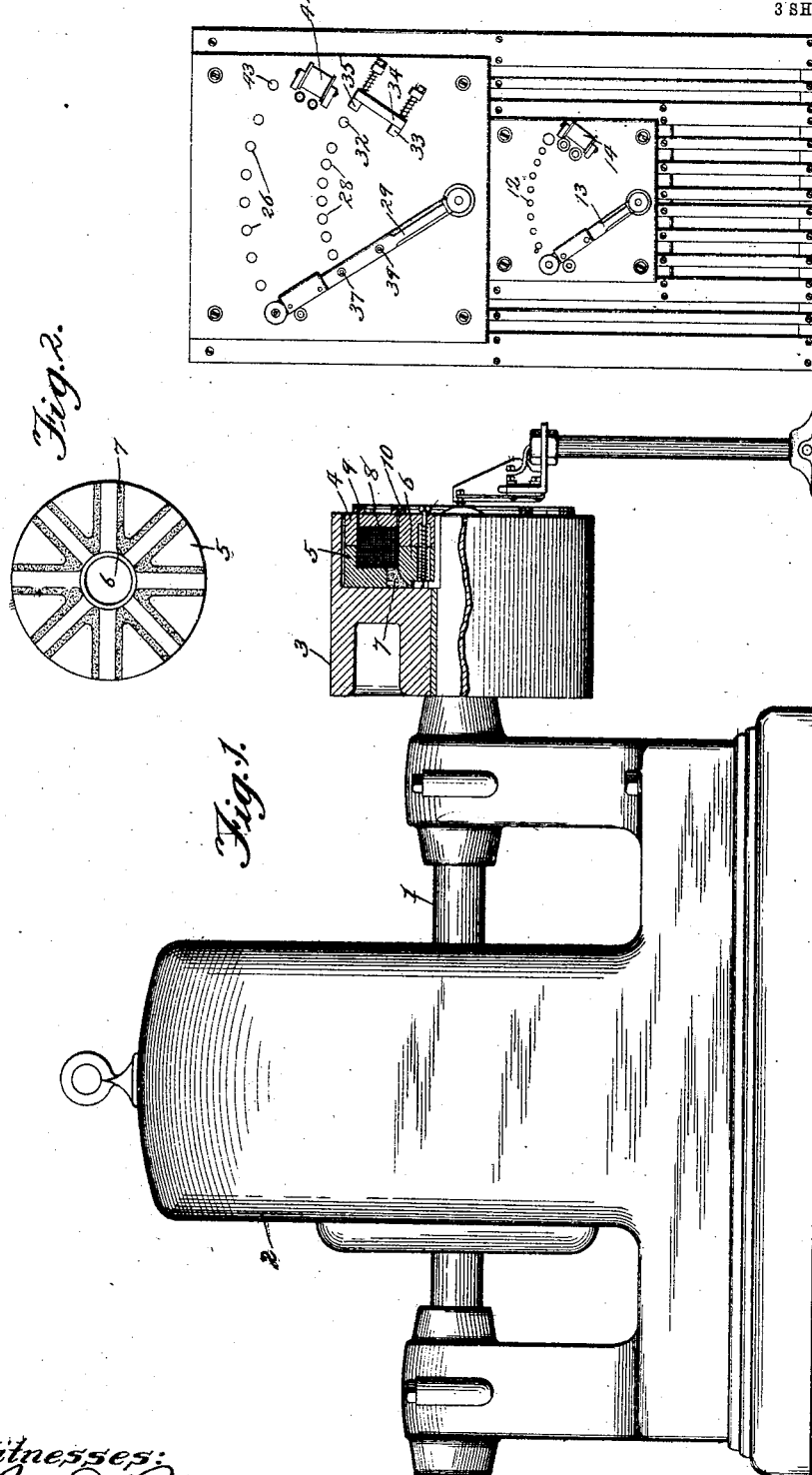

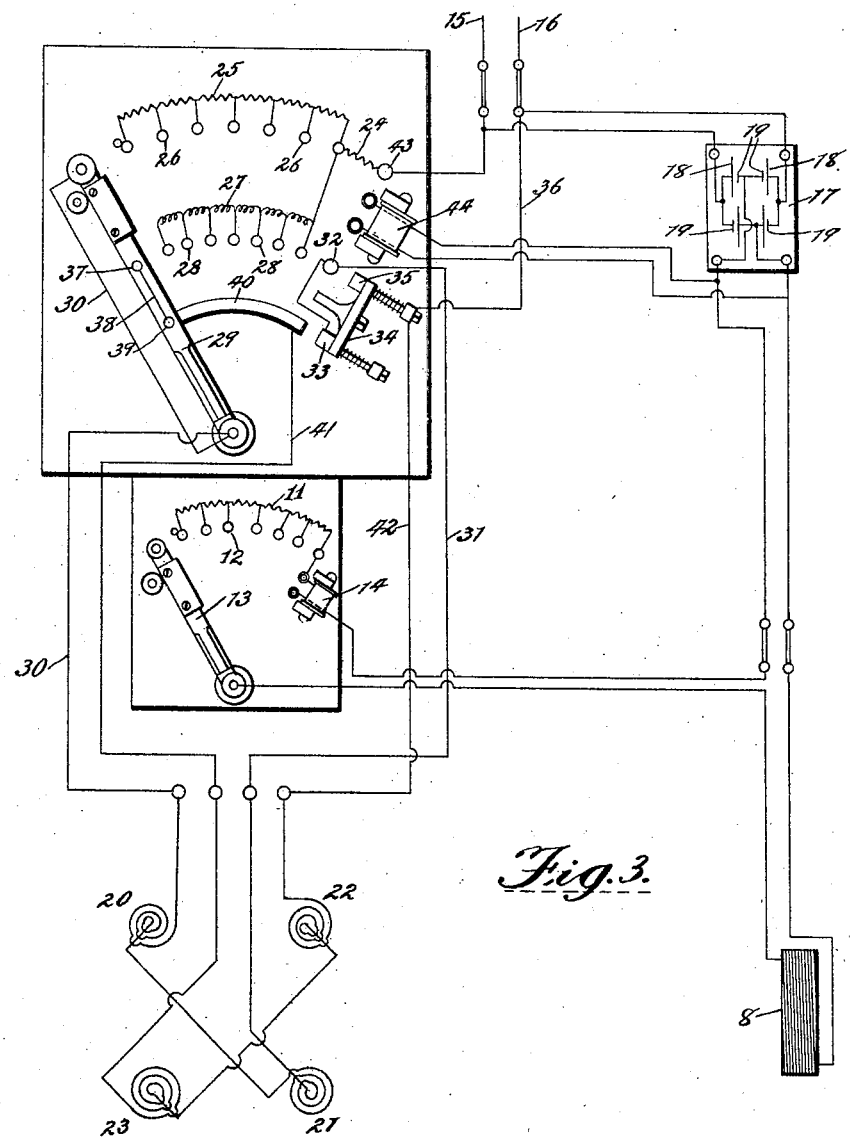

No. 786,415. PATENTED APR. 4, 1905.
H. H. CUTLER.
ALTERNATING CURRENT POWER TRANSMITTING APPARATUS.
APPLICATION FILED OCT. 22, 1903.

3 SHEETS—SHEET 3.

Witnesses:
Inventor:
Henry H. Cutler
by James Addington
attys.

No. 786,415.

Patented April 4, 1905.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

ALTERNATING-CURRENT POWER-TRANSMITTING APPARATUS.

SPECIFICATION forming part of Letters Patent No. 786,415, dated April 4, 1905.

Application filed October 22, 1903. Serial No. 178,117.

*To all whom it may concern:*

Be it known that I, HENRY H. CUTLER, a citizen of the United States, residing at Milwaukee, in the county of Milwaukee and State of Wisconsin, have invented a certain new and useful Improvement in Alternating-Current Power-Transmitting Apparatus, of which the following is a full, clear, concise, and exact description, reference being had to the accompanying drawings, forming a part of this specification.

My invention relates to an alternating-current power-transmitting apparatus, my object being to provide means whereby an alternating-current motor, either single phase or polyphase and either synchronous or non-synchronous, may be employed to efficiently and economically start and drive its load without strain upon the power-transmission system, and, moreover, to provide means whereby the part driven by the motor may be caused to rotate at any desired speed at will.

Alternating-current motors are of two general types—first, synchronous motors, which are ordinarily not self-starting, and, second, non-synchronous or induction motors, which are self-starting. The synchronous motor is ordinarily started by means of an auxiliary motor, and the induction-motor of large size is often started without its load. After the motor attains full speed the load is imposed thereon, usually through the agency of a friction-clutch, slipping belt, or similar device. The load is thus imposed abruptly and with the result that the potential of the transmission-circuit is caused to drop materially, thus disturbing the action of the generator and transformer and making the regulation difficult and more or less unsatisfactory. It is a well-known fact that alternating-current motors require very large currents in starting with the load compared with the currents which are sufficient to drive the load at normal speed after the same has been started. This is due to the fact that the power factor of the current-flow is much greater at full speed than at starting, since at full speed the phases of the currents occupy more advantageous relations to produce the turning effort. Accordingly serious difficulty has heretofore been encountered in the operation of alternating-current motors, due to the fact that the power factor of the current-flow at starting is so small compared to the power factor at full speed, thus necessitating the flow of a large current through the motor in starting the load, thereby causing a sudden drop of potential on the transmission-circuit and generally disarranging the conditions necessary for the most effective operation of the generator and transformer.

In accordance with the present invention I introduce a controllable slip between the motor and its load, whereby after the motor has attained full speed without load the load may be gradually and controllably applied. In this manner the abrupt application of the load heretofore resulting at starting is obviated, and the load may be applied so gradually that the potential of the transmission-circuit is not materially and objectionably lowered, and consequently the application of the load to the motor does not detrimentally affect the generator or transformer. I produce this controllable slip by means of one of the clutches or speed-accelerators described and claimed in my application for United States Letters Patent filed August 5, 1903, Serial No. 168,388. The driven part of this clutch may be caused to rotate at any desired speed equal to or less than that of the driving part of the clutch, and the speed of the driven part is controllable and subject to the will of the attendant, who may thus produce any desired speed of rotation of the driven part. I interpose one of these clutches between the alternating-current motor and the driving mechanism which constitutes its load, and after the motor has been brought to normal speed without load the attendant may gradually apply the load through the agency of the clutch.

My invention is applicable not only to the starting of alternating-current motors, but is equally applicable to the regulation and control of the speed of the driving mechanism constituting the load.

It is desirable that an alternating-current motor should rotate continuously at the normal speed for which the motor is designed and at which speed it will operate most effectively and efficiently. By the employment of the present invention the motor after attaining normal speed may be continuously operated at this speed, and as it is desired to alter or vary the speed of the driven mechanism the attendant may, through the agency of the controllable clutch or accelerator, vary the speed of the driven mechanism at will.

I have illustrated my invention in the accompanying drawings, in which—

Figure 5:
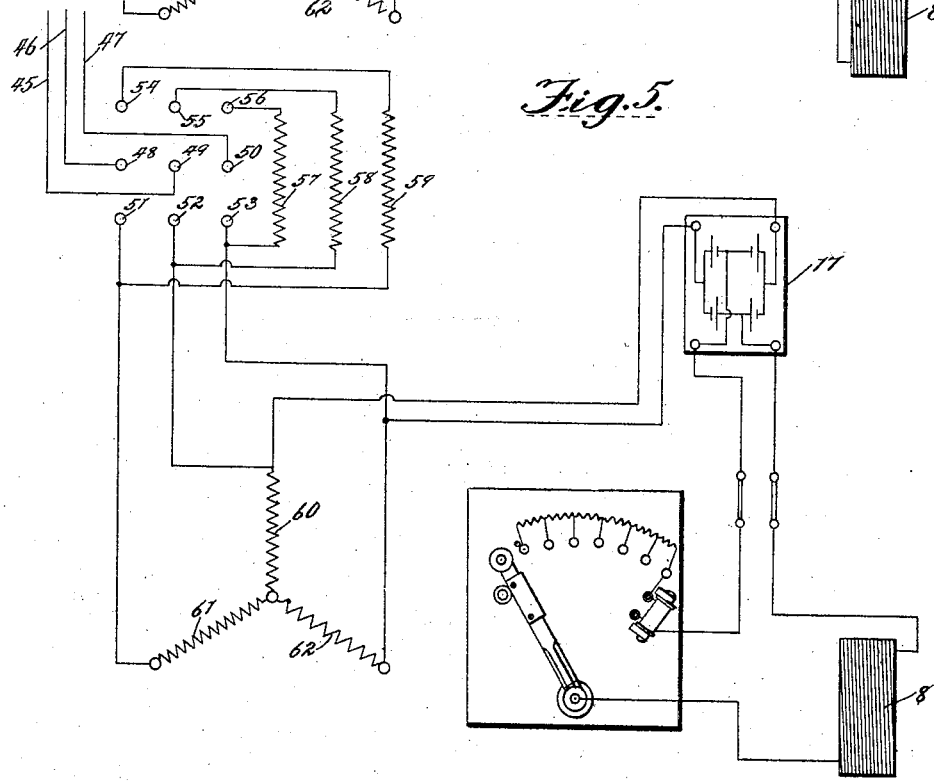

Figure 1 is a view showing an alternating-current motor with the clutch applied thereto, the regulating or governing mechanism being shown upon the right of the drawing. Fig. 2 is a face view of the primary member of the clutch or accelerator. Fig. 3 is a diagram showing the current arrangement employed in connection with a single-phase motor. Fig. 4 shows the circuit arrangement employed in connection with a three-phase motor, and Fig. 5 shows a modification of the circuit arrangement for a three-phase motor.

Like numerals refer to like parts in the several figures.

Upon the shaft 1 of the alternating-current motor 2 is carried a pulley 3, which in the present instance also constitutes the secondary or induced member of the clutch or accelerator. The primary or inducing member of this clutch is constructed in accordance with the invention of my application above mentioned and consists briefly of a back plate 4, to which are secured a pair of rings 5 6, the ring 5 carrying inwardly-extending polar projections and the ring 6 carrying outwardly-extending polar projections, the two sets of poles being arranged in overlapping positions, as shown in Fig. 2. The spaces between the pole-pieces are filled with non-magnetic material 7, which may be Babbitt metal or equivalent material. Inclosed within the primary member is the energizing-winding 8, which is shown of annular form. The terminals of the winding 8 are connected, respectively, with the contact-rings 9 10, upon which rest suitable brushes which serve to convey the current to the clutch-winding. The primary member of the clutch which contains the winding is keyed to the shaft 1, while the secondary member 3, which in the present instance is in the form of a pulley, is mounted loosely upon the shaft.

As shown in Fig. 3, the clutch-winding 8 is connected in circuit with a regulating resistance 11, the sections of which are connected with the contact-terminals 12 12, over which the contact-arm 13 is adapted to be moved by hand, a retaining-magnet 14 serving to normally hold the arm in the "on" position and a coiled spring mounted at the pivot of the lever serving to automatically return the contact-arm to the "off" position when the retaining-magnet 14 is deënergized. The clutch-winding 8 is supplied with a direct current from a suitable source, and in the present instance the clutch is shown as receiving a direct current from the alternating-current mains 15 16 through the interposition of a rectifier 17. This rectifier may be of any desired construction, and in the present instance is illustrated diagrammatically as a rectifier of the aluminium-iron type, in which the longer transverse lines 18 represent, say, iron, while the shorter lines 19 represent aluminium. The current from the alternating-current circuit will pass between these metals in one direction only. Accordingly with the cells disposed as illustrated a rectified current will be delivered to the secondary supply-circuit containing the clutch-winding.

In Fig. 3 I have illustrated diagrammatically controlling apparatus which may be used with a single-phase induction-motor having, say, four field-coils 20 21 22 23. I have selected this number of coils merely for the purpose of illustration. I have not illustrated the rotor or secondary member of the motor; but it will be understood that the usual secondary element of a single-phase motor is contemplated. With the supply-main 15 a resistance 24 is connected, and likewise a resistance 25, subdivided into a plurality of sections, is connected with the terminals 26 26. A second resistance 27 is also employed and is likewise subdivided into sections which are connected with the terminals 28 28. One of these resistances—as, for instance, resistance 25—is non-inductive in character. The resistance 27 is inductive in character. The resistance 24 may be non-inductive and is for the purpose of reducing the potential supplied to the field of the motor at starting. A contact-arm 29 is provided with a contact-brush connected by conductors 30 30 through field-windings 20 and 21, thence by conductor 31 to terminals 32 and 33, thence across bridge 34 to terminal 35, thence by conductor 36 to the opposite main 16 of the supply-circuit. The contact-arm 29 carries brush 37, adapted to sweep over terminals 28, this brush being connected by conductor 38 with brush 39, adapted to sweep over contact-bar 40, which bar is connected by conductor 41 through windings 23 and 22, thence by conductor 42 to conductor 36 and main 16. When the contact-arm 29 has been moved to the extreme position to the right, the brush upon the end thereof engages terminal 43, the brush 37 engages terminal 32, and the bridge 34 is moved, by means of the contact-arm, out of engagement with terminals 33 and 55. When the contact-arm is in its full on position, it is held by a retaining-magnet 44, which is connected across the secondary supply-circuit which supplies direct current to the clutch.

The operation of starting the motor is as follows: The parts being initially as shown in Fig. 3, the operator moves contact-arm 29 to the right, accordingly cutting out the resistance 25 and 27. Circuit is closed from main 15 through resistance 24, resistance 25, conductor 30, field-windings 20 and 21, conductor 31, terminals 32 and 33, bridge 34, terminal 35, conductor 13, to the opposite main 16. Circuit is closed from main 15 through resistance 24, resistance 27, brush 37, conductor 38, brush 39, contact 40, conductor 41, field-windings 23 and 22, conductors 42 and 36 to the opposite main 16. Since the resistance 25 is non-inductive, while the resistance 27 is inductive, the current passing through resistance 27 will be retarded in phase, and accordingly the field-windings are subjected to currents of different phase, which produce a rotating magnetic field, thereby starting the armature or secondary member of the motor. As the contact-arm is moved to the right to cut out the resistance the armature gradually builds up in speed. While the contact-arm is moved over the series of terminals 26 28, the fields, which are thus connected in two parallel paths, are subject to practically one-half of the normal voltage of the supply-circuit, due to the interposition of the resistance 24. When the contact-arm has been moved to the extreme right—that is, to the full on position—the bridge 34 is moved out of engagement with terminals 33 and 35, and the fields are thereby connected in series, the resistance 24 being at the same time removed from circuit, so that the full voltage of the supply-circuit is imposed upon the circuit containing the field-windings. This circuit may be traced from main 15 to terminals 43, thence by conductor 30 through field-windings 20 and 21, conductor 31, terminal 32, brush 37, conductor 38, brush 39, contact 40, conductor 41, field-windings 23 22, conductors 42 and 36 to the opposite main 16 of the supply-circuit. The retaining-magnet 44 serves to retain the contact-arm 29 in the full on position. The connections of an "autotransformer" may be utilized in the well-known manner for reducing the pressure on the windings at starting. The motor is thus brought to full speed without load and without undue disturbance of the pressure on the distributing-circuit. When it is desired to impose the load on the motor, the contact-arm 13 of the clutch-controlling resistance is moved to the first terminal, and current is thus closed through the clutch-windings with all the resistance in circuit. The secondary member of the clutch is thus started from rest and is accelerated in speed as the resistance is moved from the circuit of the clutch-winding by moving the contact-arm 13 to the right. When the resistance has all been removed from the circuit, the clutch-winding is energized to the maximum extent, and the energization is sufficient to bring the driven part to full speed, which has been effected by the motor working at an effective speed, with relatively high efficiency and power factor, and the electrical pressure of the distributing-circuits has not been unduly disturbed. When the contact-arm reaches the full on position, it is grasped by the retaining-magnet 14 and held in this position during normal operation. If for any reason the secondary supply-circuit containing the clutch-winding should become broken, or if the potential for any reason should fall in value, the retaining-magnets 14 and 44 would be deënergized, and the motor would thus be brought to rest, and the circuit through the clutch-winding would be opened at the controller. When it is desired to shut down the machinery which the motor is driving, the clutch-winding may be deënergized by moving the contact-arm 13 to the off position. The motor continues to run at normal speed; but the clutch permits the load to be disconnected therefrom. Likewise if it be desired to operate the driven machinery at less than normal speed the contact-arm may be moved to a position to insert resistance in series with the clutch-winding to energize the same to the desired degree, and thereby produce the desired speed of rotation of the driven member, while the motor continues to operate at its most effective speed.

In Fig. 4 I have illustrated the circuit arrangement for a polyphase induction-motor, the circuit arrangement being designed for a three-phase motor. The supply-mains 45 46 47 are connected, respectively, with the posts 48 49 50 of a three-blade double-throw switch. When thrown in one direction, the blades engage terminals 51 52 53, and when thrown in the other direction engage terminals 54 55 56. Resistances 57 58 59 are interposed between the upper set of terminals and the lower set, so that when the switch is in one position these resistances are connected in circuit, and when in the other position these resistances are removed from circuit. The field-windings 60 61 62 of the motor are connected between the terminals 51 52 53 in the usual manner, as illustrated. In order to rectify the alternating current, I have illustrated what is known as a "Cooper-Hewitt mercury-vapor rectifier" 63, the upper terminals 64 65 66 being connected, respectively, with the terminals 53, 52, and 51. The lower terminal 67 is connected through the controller and through the clutch-winding 8, thence to the point of junction of the field-windings. In starting the motor the switch-blades are moved into engagement with terminals 54 55 56, respectively, and the currents of different phase which are supplied to the field-windings 60 61 62 are reduced in amount due to the interposition of the resistances 57 58 59. As the armature of the motor rises in speed the switch-blades are thrown into engagement with terminals 51 52 53, thus removing the resistance from circuit and permitting the armature to attain full speed. The rectifier serves to supply a direct current to the clutch, and the load may be applied to the motor after the same has attained full speed, or the clutch-winding may be energized before the motor has been started, as may be desired. The connections of autotransformers may be utilized in the well-known manner instead of the resistances for starting the moter, or the starting resistances (of proper character) may be introduced into the secondary circuits of the motor through the intervention of collector-rings, and these may be controlled by the controller as aforesaid.

Fig. 5 shows a modification of the structure shown in Fig. 4, the difference being that instead of a Cooper Hewitt rectifier an aluminium-iron rectifier 17 is employed. This rectifier derives alternating current from the terminals 52 53 and delivers direct current to the circuit of the clutch-winding and controller magnets.

My method of operation makes it possible, as above stated, to start a large load and vary the speed thereof in connection with an alternating-current motor while the motor is operated at its effective speed and is therefore capable of doing its work at a relatively high efficiency and high power factor, so that the losses in the motor are reduced and the electrical pressure of the distributing-lines need not be disturbed in the undue manner heretofore a feature of starting and varying the speed of loads driven by alternating-current motors. By the interposition of a controllable slip device between the motor and its load I am thus enabled by the present invention to entirely obviate the above-mentioned objections heretofore encountered in the operation of alternating-current motors.

It will be noted that by means of the present invention I have devised a radically new method of starting alternating-current motors, which consists in starting the rotor of the motor in the usual manner without load, introducing a controllable slip between the rotor and the load, (this controllable slip taking place between two suitable polar surfaces, one of which moves with the rotor of the motor and the other with the load,) subjecting the controllable slip-surfaces to inductive action to accelerate the load, (this inductive effect being controllable, whereby the load may be accelerated at any desired rate,) and, finally, if it be desired to bring the load to the full speed of the rotor of the motor, superimposing upon the inductive effect the frictional effect of the driving controllable slip-surface upon the driven controllable slip-surface.

Having described my invention, what I claim as new, and desire to secure by Letters Patent, is—

1. The combination with an alternating-current-supply circuit, and an alternating-current motor, of an inherently gradually accelerating magnetic clutch or accelerator associated therewith whereby the load may be imposed without disturbing said supply-circuit.

2. The combination with an alternating-current-supply circuit and an alternating-current motor, of an inherently gradually accelerating magnetic clutch associated therewith, and a controller for said clutch whereby the load may be imposed without disturbing said supply-circuit and whereby the load may be driven at less than normal speed at will.

3. The combination with an alternating-current-supply circuit, of an alternating-current motor, an inherently gradually accelerating clutch or accelerator associated therewith, and suitable means for supplying a direct current to said clutch.

4. The combination with an alternating-current-supply circuit and an alternating-current motor supplied with current thereby, of an inherently gradually accelerating magnetic clutch or accelerator, a controller for said clutch, and suitable means for supplying a direct current to said clutch.

5. The combination with an alternating-current-supply circuit and an alternating-current motor supplied with current thereby, of a controllable magnetic clutch associated therewith, and means for converting alternating current from said circuit into a current suitable for energizing said clutch.

6. The combination with an alternating-current-supply circuit and an alternating-current motor, of a magnetic clutch whose driven member is accelerated through the combined influence of induction and friction associated therewith, whereby the load may be imposed without disturbing said supply-circuit.

7. The combination with an alternating-current-supply circuit and an alternating-current motor, of a magnetic clutch whose driven member is accelerated through the combined influence of induction and friction associated therewith, and a controller for said clutch.

8. The combination with an alternating-current-supply circuit and an alternating-current motor, a magnetic clutch whose driven member is accelerated through the combined influence of induction and friction, and suitable means for supplying a direct current to said clutch.

9. The combination with an alternating-current-supply circuit and an alternating-current motor, supplied with current thereby, of a clutch whose driven member is accelerated through the combined influence of induction and friction, a controller for said clutch, and suitable means for supplying a direct current to said clutch.

10. The combination with an alternating-current-supply circuit and an alternating-current motor supplied with current thereby, of a controllable magnetic clutch, and a rectifier for converting alternating current from said circuit into a current for energizing said clutch.

11. The combination with an alternating-current-supply circuit and a motor supplied with current thereby, of an inherently gradually accelerating magnetic clutch or accelerator associated therewith, and a variable resistance for controlling said clutch.

12. The combination with an alternating-current-supply circuit and a motor supplied with current thereby, of an inherently gradually accelerating magnetic clutch or accelerator associated therewith, a variable resistance for controlling said clutch and a retaining-magnet for normally holding the resistance-varying element thereof in a prearranged position.

13. The combination with an alternating-current-supply circuit, of a motor associated therewith, a suitable starting device for said motor, a magnetic clutch or accelerator associated with said motor, a retaining-magnet for the operating elements of said starting device, and suitable means for converting the current from said supply-circuit into a current suitable for said retaining-magnet and said clutch.

14. The combination with an alternating-current-supply circuit, of a motor connected therewith, a suitable starting device for said motor, a magnetic clutch or accelerator associated with said motor, a starting-box for said clutch, retaining-magnets for the operative elements of said starting-box, and of said starting device, and means for converting the current from said supply-circuit into a current suitable for said retaining-magnets and said clutch.

15. Means for improving the power factor and efficiency at starting an alternating-current motor which consist in combination with the rotating part of the said motor and its load, of the provision of means which inherently produce a gradually-decreasing slip between said rotating part and the load.

16. Means for improving the power factor and efficiency at starting a loaded alternating-current motor which consist in combining with the rotating part of the said motor and its load, of provisions for controllable inductive and frictional slip between the said rotating part and the load.

17. The combination with the rotor of an alternating-current motor and the load thereof, of an inherently gradually decreasing slip device between the said rotor and the load.

18. The combination with the rotor of an alternating-current motor and the load thereof, of an inherently gradually decreasing slip device between the said rotor and the load, the slippage of said device being jointly inductive and frictional.

19. The combination with the rotor of an alternating-current motor and the load thereof, of an inherently gradually accelerating magnetic clutch whereby slip may be introduced between the said rotor and its load, and means for controlling the said slip.

20. The combination with the rotor of an alternating-current motor and the load thereof, of an inherently gradually accelerating magnetic clutch arranged to introduce inductive and frictional slip between the said rotor and its load, and means for controlling the said slip so that the load may be efficiently brought to full speed without undue disturbance of the electrical supply-circuits.

21. Means for gradually starting the load of an alternating-current motor, which consists in combination with the rotor of said motor and the load thereof, of an inherently gradually accelerating magnetic clutch.

In witness whereof I have hereunto subscribed my name in the presence of two witnesses.

HENRY H. CUTLER.

Witnesses:
  T. E. BARNUM,
  A. W. BERRESFORD.